US007761787B2

(12) United States Patent
Singleton et al.

(10) Patent No.: US 7,761,787 B2
(45) Date of Patent: Jul. 20, 2010

(54) DOCUMENT GENERATION SYSTEM AND USER INTERFACE FOR PRODUCING A USER DESIRED DOCUMENT

(75) Inventors: Walt Singleton, Collegeville, PA (US); Frank W. Racis, Spring City, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1395 days.

(21) Appl. No.: 10/725,154

(22) Filed: Dec. 1, 2003

(65) Prior Publication Data

US 2004/0153465 A1      Aug. 5, 2004

Related U.S. Application Data

(60) Provisional application No. 60/430,220, filed on Dec. 2, 2002.

(51) Int. Cl.
*G06F 17/00* (2006.01)

(52) U.S. Cl. ............... 715/243; 715/222; 715/225; 715/226

(58) Field of Classification Search ............ 715/507
See application file for complete search history.

(56) References Cited

U.S. PATENT DOCUMENTS

| 5,222,236 | A | 6/1993 | Potash et al. | 395/600 |
| 6,065,026 | A | 5/2000 | Cornelia et al. | 707/531 |
| 6,084,585 | A * | 7/2000 | Kraft et al. | 715/733 |
| 6,209,004 | B1 | 3/2001 | Taylor | 707/500 |
| 6,473,892 | B1 | 10/2002 | Porter | 717/106 |
| 6,476,828 | B1 | 11/2002 | Burkett et al. | 345/760 |
| 6,498,657 | B1 | 12/2002 | Kuntz et al. | 358/1.15 |
| 2002/0055945 | A1 | 5/2002 | Endress et al. | 707/500 |

OTHER PUBLICATIONS

Marchal, B., "Applied XML Solutions, The Authoritative Solution," Sam's, 2000, cover, copyright page, and pp. 71-194, 208-214, and 329-499.*
Muench, S., "Building Oracle XML Applications," O'Reilly & Associates, 2000, cover, copyright page, and pp. 284-309, 375-387, and 433-499.*
Marchal, B., "Applied XML Solutions, The Authoritative Solution," Sam's, 2000, previously provided to Applicants.*
Muench, S., "Building Oracle XML Applications," O'Reilly & Associates, 2000, previously provided to Applicants.*
ProLaw Document Management http://www.prolaw.com/document. html Report Lab http://www.reportlab.com.
Inventive Designers http://www.inventivedesigners.com.

* cited by examiner

*Primary Examiner*—Stephen S Hong
*Assistant Examiner*—Matthew J Ludwig

(57) ABSTRACT

A document generation system produces a document from information derived from an information repository. The document generation system includes a source of code, a source of document generation control information, and a document processor. The source of code represents a document template including data fields containing placeholder items to be replaced by desired data items, and a repetition identifier indicating that one of the data fields is to be replicated to provide a group of data fields to be replaced by the desired data items. The source of document generation control information supports insertion of the desired data items derived from the information repository in the data fields. The document processor applies the control information in replacing template document data field placeholder items with desired data items to produce a generated document.

17 Claims, 16 Drawing Sheets

800

THIS IS A SAMPLE DOCUMENT!

201 ⟶ 207
FIRST NAME: THOMAS

202 ⟶ 208
LAST NAME: THOMASON

203 ⟶
DEPENDENT LIST:

| FIRST NAME (204) | LAST NAME (205) | AGE (206) |
|---|---|---|
| NORMAN | NORMANSON | 45 |
| STEPHEN | STEVENSON | 37 |
| ROGER | ROGERSON | 48 |
| 403 | 404 | 405 |

SampleTemplate.rtf

{\rtf1\ansi\ansicpg1252\uc1
\deff0\deflang1033\deflangfe1033{\fonttbl{\f0\froman\fcharset0\fprq2{\*\panose
0202060305040502030}Times New Roman; }{\f30\froman\fcharset238\fprq2 Times New Roman
CE;}{\f31\froman\fcharset204\fprq2 Times New Roman Cyr;}
{\f33\froman\fcharset161\fprq2 Times New Roman Greek ;}{\f34\froman\fcharset162\fprq2
Times New Roman Tur;}{\f35\froman\fcharset177\fprq2 Times New Roman
(Hebrew) ;}{\f36\froman\fcharset178\fprq2 Times New Roman (Arabic);}
{\f37\froman\fcharset186\fprq2 Times New Roman
Baltic;}}{\colortbl;\red0\green0\blue0;\red0\green0\blue255;\red0\green255\blue255;\
red0\green255\blue0;\red255\green0\blue255;\red255\green0\blue0;\red255\green255\blu
e0;\red255\green255\blue255;
\red0\green0\blue128;\red0\green128\blue128;\red0\green128\blue0;\red128\green0\blue
128;\red128\green0\blue0;\red128\green128\blue0;\red128\green128\blue128;\red192\gre
en192\blue192;}{\stylesheet{
\ql \li0\ri0\widctlpar\aspalpha\aspnum\faauto\adjustright\rin0\lin0\itap0
\fs24\lang1033\langfe1033\cgrid\langnp1033\langfenp1033 \snext0 Normal;}{\*\cs10
\additive Default Paragraph Font;}}{\*\filetbl }{\info{\author Walt Singleton}
{\operator Walt
Singleton} {\creatim\yr2002\mo11\dy27\hr13\min3}{\revtim\yr2002\mo11\dy27\hr13\min3}{
\version3}{\edmins0}{\nofpages1}{\nofwords39}{\nofchars226}{\*\company
Siemens} {\nofcharsws0}{\vern8269}}
\widowctrl\ftnbj\aenddoc\noxlattoyen\expshrtn\noultrlspc\dntblnsbdb\nospaceforul\hyp
hcaps0\horzdoc\dghspace120\dgvspace120\dghorigin1701\dgvorigin1984\dghshow0\dgvshow3
\jcompress\viewkind4\viewscale100\nolnhtadjtbl \fet0\sectd \linex0\sectdefaultcl
{\*\pnseclvl1\pnucrm\pnstart1\pnindent720\pnhang{\pntxta
.}}{\*\pnseclvl2\pnucltr\pnstart1\pnindent720\pnhang{\pntxta
.}}{\*\pnseclvl3\pndec\pnstart1\pnindent720\pnhang{\pntxta
.}}{\*\pnseclvl4\pnlcltr\pnstart1\pnindent720\pnhang{\pntxta }}}{\*\pnseclvl5
\pndec\pnstart1\pnindent720\pnhang{\pntxtb (}{\pntxta
)}}{\*\pnseclvl6\pnlcltr\pnstart1\pnindent720\pnhang{\pntxtb (}{\pntxta
)}}{\*\pnseclvl7\pnlcrm\pnstart1\pnindent720\pnhang{\pntxtb (}{\pntxta
)}}{\*\pnseclvl8\pnlcltr\pnstart1\pnindent720\pnhang
{\pntxtb (}{\pntxta )}}{\*\pnseclvl9\pn1crm\pnstart1\pnindent720\pnhang{\pntxtb
(}{\pntxta )}}\pard\plain \ql \li0\ri0\nowidctlpar\faauto\rin0\lin0\itap0
\fs24\lang1033\langfe1033\cgrid\langnp1033\langfenp1033 {\field{\*\fldinst {\fs20
DATA "F:\\\
Patent-Samples\\\\SampleDatasource.txt" }}{\fldrslt }}{\fs32 This is a Sample
Document!
\par }\pard \ql
\li0\ri0\widctlpar\aspalpha\aspnum\faauto\adjustright\rin0\lin0\itap0 {\fs20
\par 201                    207

\par First Name: }{\field{\*\fldinst {\fs20 MERGEFIELD FirstName }}{\fldrslt   202
{\fs20\lang1024\langfe1024\noproof \'abFirstName\'bb}}}{\fs20 \tab \tab Last Name:
}{\field{\*\fldinst {\fs20\lang1024\langfe1024\noproof MERGEFIELD LastName
}}{\fldrslt {                                                                   208
\fs20\lang1024\langfe1024\noproof \'abLastName\'bb}}}{\fs20
\par              203
\par }{\b\fs20\ul Dependent List:
\par
\par }\trowd \trgaph108\trleft-108\trbrdrt\brdrs\brdrw10 \trbrdrl\brdrs\brdrw10
\trbrdrb\brdrs\brdrw10 \trbrdrr\brdrs\brdrw10 \trbrdrh\brdrs\brdrw10
\trbrdrv\brdrs\brdrw10
\trftswidth1\trautofit1\trpaddl108\trpaddr108\trpaddfl3\trpaddfr3 \clvertalt\clbrdrt
\brdrs\brdrw10 \clbrdrl\brdrs\brdrw10 \clbrdrb\brdrs\brdrw10 \clbrdrr\brdrs\brdrw10
\cltxlrtb\clftsWidth3\clwWidth3672 \cellx2896\clvertalt\clbrdrt\brdrs\brdrw10
\clbrdrl\brdrs\brdrw10 \clbrdrb\brdrs\brdrw10 \clbrdrr\brdrs\brdrw10
\cltxlrtb\clftsWidth3\clwWidth3672 \cellx5894\clvertalt\clbrdrt\brdrs\brdrw10
\clbrdrl\brdrs\brdrw10 \clbrdrb\brdrs\brdrw10 \clbrdrr\brdrs\brdrw10
\cltxlrtb\clftsWidth3\clwWidth3672 \cellx8748\pard
\ql \li0\ri0\widctlpar\intbl\aspalpha\aspnum\faauto\adjustright\rin0\lin0
{\i\fs20\ul First Name\cell Last Name\cell Age\cell }\pard \ql 204 —— \li0\ri0\widctlpar\intbl\aspalpha\aspnum\faauto\adjustright\rin0\lin0 {\fs20 \trowd
\trgaph108\trleft-108\trbrdrt            —205      —206
\brdrs\brdrw10 \trbrdrl\brdrs\brdrw10 \trbrdrb\brdrs\brdrw10 \trbrdrr\brdrs\brdrw10
\trbrdrh\brdrs\brdrw10\trbrdrv\brdrs\brdrw10
\trftswidth1\trautofit1\trpaddl108\trpaddr108\trpaddfl3\trpaddfr3
\clvertalt\clbrdrt\brdrs\brdrw10 \clbrdrl\brdrs\brdrw10
\clbrdrb\brdrs\brdrw10\clbrdrr\brdrs\brdrw10 \cltxlrtb\clftsWidth3\clwWidth3672
\cellx2896\clvertalt\clbrdrt\brdrs\brdrw10 \clbrdrl\brdrs\brdrw10
\clbrdrb\brdrs\brdrw10\clbrdrr\brdrs\brdrw10 \cltxlrtb\clftsWidth3\clwWidth3672
\cellx5894\clvertalt
\clbrdrt\brdrs\brdrw10 \clbrdrl\brdrs\brdrw10 \clbrdrb\brdrs\brdrw10
\clbrdrr\brdrs\brdrw10 \cltxlrtb\clftsWidth3\clwWidth3672 \cellx8748\row }\trowd
\trgaph108\trleft-108\trbrdrt\brdrs\brdrw10 \trbrdrl\brdrs\brdrw10
\trbrdrb\brdrs\brdrw10 \trbrdrr
\brdrs\brdrw10 \trbrdrh\brdrs\brdrw10 \trbrdrv\brdrs\brdrw10
\trftswidth1\trautofit1\trpaddl108\trpaddr108\trpaddfl3\trpaddfr3
\clvertalt\clbrdrt\brdrs\brdrw10 \clbrdrl\brdrs\brdrw10 \clbrdrb\brdrs\brdrw10
\clbrdrr\brdrs\brdrw10

\cltxlrtb\clftsWidth3\clwWidth3672 \cellx2896\clvertalt\clbrdrt\brdrs\brdrw10
\clbrdrl\brdrs\brdrw10 \clbrdrb\brdrs\brdrw10 \clbrdrr\brdrs\brdrw10
\cltxlrtb\clftsWidth3\clwWidth3672 \cellx5894\clvertalt\clbrdrt\brdrs\brdrw10
\clbrdrl\brdrs\brdrw10
\clbrdrb\brdrs\brdrw10 \clbrdrr\brdrs\brdrw10 \cltxlrtb\clftsWidth3\clwWidth3672
\cellx8748\pard \ql
\li0\ri0\widctlpar\intbl\aspalpha\aspnum\faauto\adjustright\rin0\lin0 {\*\bkmkstart
Dependents}{\field\flddirty{\*\fldinst {\fs20 MERGEFIELD DFirstName }   <u>209</u>
}{\fldrslt {\fs20\lang1024\langfe1024\noproof \'abDFirstName\'bb}}}{\fs20 \cell
}{\field\flddirty{\*\fldinst {\fs20 MERGEFIELD DLastname}}{\fldrslt
{\fs20\lang1024\langfe1024\noproof\'abDLastName\'bb}}}{\fs20 \cell
}{\field\flddirty{\*\fldinst {\fs20         — 210

<u>211</u>  MERGEFIELD DAge }}{\fldrslt {\fs20\lang1024\langfe1024\noproof
\'abDAge\'bb}}}{\fs20 \cell }\pard \ql
\li0\ri0\widctlpar\intbl\aspalpha\aspnum\faauto\adjustright\rin0\lin0 {\fs20 \trowd
\trgaph108\trleft-108\trbrdrt\brdrs\brdrw10 \trbrdrl\brdrs\brdrw10
\trbrdrb\brdrs\brdrw10\trbrdrr\brdrs\brdrw10 \trbrdrh\brdrs\brdrw10
\trbrdrv\brdrs\brdrw10
\trftswidth1\trautofit1\trpaddl108\trpaddr108\trpaddfl3\trpaddfr3
\clvertalt\clbrdrt\brdrs\brdrw10 \clbrdrl\brdrs\brdrw10 \clbrdrb\brdrs\brdrw10
\clbrdrr
\brdrs\brdrw10 \cltxlrtb\clftsWidth3\clwWidth3672
\cellx2896\clvertalt\clbrdrt\brdrs\brdrw10 \clbrdrl\brdrs\brdrw10
\clbrdrb\brdrs\brdrw10 \clbrdrr\brdrs\brdrw10 \cltxlrtb\clftsWidth3\clwWidth3672
\cellx5894\clvertalt\clbrdrt\brdrs\brdrw10 \clbrdrl
\brdrs\brdrw10 \clbrdrb\brdrs\brdrw10 \clbrdrr\brdrs\brdrw10
\cltxlrtb\clftsWidth3\clwWidth3672 \cellx8748\row }\pard \ql
\li0\ri0\widctlpar\aspalpha\aspnum\faauto\adjustright\rin0\lin0\itap0 {\fs20
{\*\bkmkend Dependents}
\par }}

THIS IS A SAMPLE DOCUMENT!

201 — 207          202 — 206
First Name: <<FirstName>>     Last Name: <<LastName>>

203 —
DEPENDENT LIST:

| FIRST NAME (204) | LAST NAME (205) | AGE (206) |
|---|---|---|
| <<DFirstName>> | <<DLastName>> | <<DAge>> |
| 209 | 210 | 211 |

| 201 | 202 | 203 | 209 | 210 | 211 |
|---|---|---|---|---|---|
| FirstName | LastName | Dependents | DFirstName | DLastName | DAge |
| /Stuff/Name/First | /Stuff/Name/Last | /Stuff/Dependents/Person | Name/First | Name/Last | Age |
| 401 | 402 | 406 | 403 | 404 | 405 |

```
<?xml version="1.0" ?>
- <xsl:transform xmlns:xsl="http://www.w3.org/1999/XSL/Transform"
  version="1.0">
  <xsl:output method="text" omit-xml-declaration="yes"/>
- <xsl:template match="/">
    {\rtf1\ansi\ansicpg1252\uc1 \deff0\deflang1033\deflangfe1033{\fonttbl
    {\f0\froman\fcharset0\fprq2{\*\panose 02020603050405020304}Times
    New Roman;}{\f30\froman\fcharset238\fprq2 Times New Roman CE;}
    {\f31\froman\fcharset204\fprq2 Times New Roman Cyr;} {\f33
    \froman\fcharset161\fprq2 Times New Roman Greek;}{\f34
    \froman\fcharset162\fprq2 Times New Roman Tur;}{\f35
    \froman\fcharset177\fprq2 Times New Roman (Hebrew);}{\f36
    \froman\fcharset178\fprq2 Times New Roman (Arabic);} {\f37
    \froman\fcharset186\fprq2 Times New Roman Baltic;}}{\colortbl;\red0
    \green0\blue0;\red0\green0\blue255;\red0\green255\blue255;\red0
    \green255\blue0;\red255\green0\blue255;\red255\green0
    \blue0;\red255\green255\blue0;\red255\green255\blue255; \red0
    \green0\blue128;\red0\green128\blue128;\red0\green128
    \blue0;\red128\green0\blue128;\red128\green0\blue0;\red128
    \green128\blue0;\red128\green128\blue128;\red192\green192
    \blue192;}{\stylesheet{ \ql \li0\ri0
    \widctlpar\aspalpha\aspnum\faauto\adjustright\rin0\lin0\itap0 \fs24
    \lang1033\langfe1033\cgrid\langnp1033\langfenp1033 \snext0 Normal;}
    {\*\cs10 \additive Default Paragraph Font;}}{\*\filetbl }{\info{\author
    Walt Singleton} {\operator Walt Singleton}{\creatim\yr2002\mo11\dy27
    \hr13\min3} {revtim\yr2002\mo11\dy27\hr13\min3}{\version3}
    {\edmins0}{\nofpages1}{\nofwords39}{\nofchars226}{\*\company
    Siemens}{\nofcharsws0}{\vern8269}}
    \widowctrl\ftnbj\aenddoc\noxlattoyen\expshrtn\noultrlspc\dntblnsbdb\nospaceft
    \horzdoc\dghspace120\dgvspace120\dghorigin1701\dgvorigin1984
    \dghshow0\dgvshow3\jcompress\viewkind4\viewscale100\nolnhtadjtbl
    \fet0\sectd \linex0\sectdefaultcl {\*\pnseclvl1\pnucrm\pnstart1
    \pnindent720\pnhang{\pntxta .}}{\*\pnseclvl2\pnucltr\pnstart1
    \pnindent720\pnhang{\pntxta .}}{\*\pnseclvl3\pndec\pnstart1
    \pnindent720\pnhang{\pntxta .}}{\*\pnseclvl4\pnlcltr\pnstart1
    \pnindent720\pnhang{\pntxta )}}{\*\pnseclvl5\pndec\pnstart1
    \pnindent720\pnhang{\pntxtb (}{\pntxta )}}{\*\pnseclvl6
    \pnlcltr\pnstart1\pnindent720\pnhang{\pntxtb (}{\pntxta )}}
    {\*\pnseclvl7\pnlcrm\pnstart1\pnindent720\pnhang{\pntxtb ()
```

{\pntxta )}}{\*\pnseclvl8\pnlcltr\pnstart1\pnindent720\pnhang
{\pntxtb (}{\pntxta )}}{\*\pnseclvl9\pnlcrm\pnstart1\pnindent720
\pnhang{\pntxtb (}{\pntxta )}}\pard\plain \qt \li0\ri0
\nowidctlpar\faauto\rin0\lin0\itap0 \fs24\lang1033\langfe1033
\cgrid\langnp1033\langfenp1033 {\field{\*\fldinst {\fs20 DATA "F:\\\\
Patent-Samples\\\\SampleDatasource.txt" }}{\fldrslt }}{\fs32 This is a
Sample Document! \par }\pard \ql \li0\ri0
\widctlpar\aspalpha\aspnum\faauto\adjustright\rin0\lin0\itap0 {\fs20
\par \par First Name: }{\fs20\lang1024\langfe1024\noproof 401  <xsl:value-of select="/Stuff/Name/First" />
     }{\fs20 \tab \tab Last Name: }{ \fs20\lang1024\langfe1024\noproof
402  <xsl:value-of select= "/Stuff/Name/Last" />
     }{\fs20 \par \par }{\b\fs20\ul Dependent List: \par \par }\trowd
\trgaph108\trleft-108\trbrdrt\brdrs\brdrw10 \trbrdrl\brdrs\brdrw10
\trbrdrb\brdrs\brdrw10 \trbrdrr\brdrs\brdrw10 \trbrdrh\brdrs\brdrw10
\trbrdrv\brdrs\brdrw10 \trftsWidth1\trautofit1\trpaddl108\trpaddr108
\trpaddfl3\trpaddfr3 \clvertalt\clbrdrt \brdrs\brdrw10
\clbrdrl\brdrs\brdrw10 \clbrdrb\brdrs\brdrw10 \clbrdrr\brdrs\brdrw10
\cltxlrtb\clftsWidth3\clwWidth3672\cellx2896
\clvertalt\clbrdrt\brdrs\brdrw10 \clbrdrl\brdrs\brdrw10
\clbrdrb\brdrs\brdrw10 \clbrdrr\brdrs\brdrw10 \cltxlrtb\clftsWidth3
\clwWidth3672\cellx5894\clvertalt\clbrdrt\brdrs\brdrw10
\clbrdrl\brdrs\brdrw10 \clbrdrb\brdrs\brdrw10 \clbrdrr\brdrs\brdrw10
\cltxlrtb\clftsWidth3\clwWidth3672 \cellx8748\pard \ql \li0\ri0
\widctlpar\intbl\aspalpha\aspnum\faauto\adjustright\rin0\lin0 {\f\fs20
\ul First Name\cell Last Name\cell Age\cell }\pard \ql \li0\ri0
\widctlpar\intbl\aspalpha\aspnum\faauto\adjustright\rin0\lin0 {\fs20
\trowd \trgaph108\trleft-108\trbrdrt \brdrs\brdrw10
\trbrdrl\brdrs\brdrw10 \trbrdrb\brdrs\brdrw10 \trbrdrr\brdrs\brdrw10
\trbrdrh\brdrs\brdrw10 \trbrdrv\brdrs\brdrw10 \trftsWidth1\trautofit1
\trpaddl108\trpaddr108\trpaddfl3\trpaddfr3
\clvertalt\clbrdrt\brdrs\brdrw10\clbrdrl\brdrs\brdrw10
\clbrdrb\brdrs\brdrw10 \clbrdrr\brdrs\brdrw10 \cltxlrtb\clftsWidth3
\clwWidth3672 \cellx2896\clvertalt\clbrdrt\brdrs\brdrw10
\clbrdrl\brdrs\brdrw10 \clbrdrb\brdrs\brdrw10 \clbrdrr\brdrs\brdrw10
\cltxlrtb\clftsWidth3\clwWidth3672\cellx5894\clvertalt
\clbrdrt\brdrs\brdrw10 \clbrdrl\brdrs\brdrw10 \clbrdrb\brdrs\brdrw10
\clbrdrr\brdrs\brdrw10 \cltxlrtb\clftsWidth3\clwWidth3672 \cellx8748
\row }\trowd \trgaph108\trleft-108\trbrdrt\brdrs\brdrw10

\trbrdrl\brdrs\brdrw10\trbrdrb\brdrs\brdrw10 \trbrdrr \brdrs\brdrw10
\trbrdrh\brdrs\brdrw10 \trbrdrv\brdrs\brdrw10\trftsWidth1\trautofit1
\trpaddl108\trpaddr108\trpaddfl3\trpaddfr3
\clvertalt\clbrdrt\brdrs\brdrw10 \clbrdrl\brdrs\brdrw10
\clbrdrb\brdrs\brdrw10 \clbrdrr\brdrs\brdrw10 \cltxlrtb\clftsWidth3
\clwWidth3672 \cellx2896\clvertalt\clbrdrt\brdrs\brdrw10
\clbrdrl\brdrs\brdrw10 \clbrdrb\brdrs\brdrw10 \clbrdrr\brdrs\brdrw10
\cltxlrtb\clftsWidth3\clwWidth3672 \cellx5894
\clvertalt\clbrdrt\brdrs\brdrw10 \clbrdrl\brdrs\brdrw10
\clbrdrb\brdrs\brdrw10 \clbrdrr\brdrs\brdrw10 \cltxlrtb\clftsWidth3
\clwWidth3672 \cellx8748

406 {xsl:for-each select="/Stuff/Dependents/Person">
\pard \ql \li0\ri0
\widctlpar\intbl\aspalpha\aspnum\faauto\adjustright\rin0\lin0
{\fs20\lang1024\langfe1024\noproof

403 <xsl:value-of select="Name/First"/>
}{\fs20 \cell}{\fs20\lang1024\langfe1024\noproof

404 <xsl:value-of select="Name/Last" />
}{\fs20 \cell }{\fs20\lang1024\langfe1024\noproof

405 <xsl:value-of select="Age" />
}{\fs20 \cell }\pard \ql \li0\ri0
\widctlpar\intbl\aspalpha\aspnum\faauto\adjustright\rin0\lin0
{\fs20 \trowd \trgaph108\trleft-108\trbrdrt\brdrs\brdrw10
\trbrdrl\brdrs\brdrw10 \trbrdrb\brdrs\brdrw10
\trbrdrr\brdrs\brdrw10 \trbrdrh\brdrs\brdrw10
\trbrdrv\brdrs\brdrw10 \trftsWidth1\trautofit1\trpaddl108
\trpaddr108\trpaddfl3\trpaddfr3 \clvertalt\clbrdrt\brdrs\brdrw10
\clbrdrl\brdrs\brdrw10 \clbrdrb\brdrs\brdrw10 \clbrdrr
\brdrs\brdrw10 \cltxlrtb\clftsWidth3\clwWidth3672 \cellx2896
\clvertalt\clbrdrt\brdrs\brdrw10 \clbrdrl\brdrs\brdrw10
\clbrdrb\brdrs\brdrw10 \clbrdrr\brdrs\brdrw10 \cltxlrtb\clftsWidth3
\clwWidth3672 \cellx5894\clvertalt\clbrdrt\brdrs\brdrw10 \clbrdrl
\brdrs\brdrw10 \clbrdrb\brdrs\brdrw10 \clbrdrr\brdrs\brdrw10
\cltxlrtb\clftsWidth3\clwWidth3672 \cellx8748\row }
</xsl:for-each>
\pard \ql \li0\ri0\widctlpar\aspalpha\aspnum\faauto\adjustright\rin0
\lin0\itap0 {\fs20 \par }}
</xsl:template>
</xsl:transform>

```
-<Stuff>
  -<Name>    401
      <First>Thomas</First>
      <Last>Thomason</Last>    402
   </Name>
  •<Dependents>
  -<Person>
   -<Name>
      <First> Norman</First>   403
      <Last> Normanson</Last>
    </Name>           404
     <Age>45</Age> 405
   </Person>
  -<Person>
   -<Name>
      <First>Stephen</First>
      <Last> Stevenson </Last>
    </Name>
    <Age>37</Age>
   </Person>
  -<Person>
   •<Name>
      <First> Roger</First>
      <Last>Rogerson</Last>
    </Name>
    <Age>48</Age>
   </Person>
  </Dependents>
</Stuff>
```

700 outputfile.RTF

{\rtf1\ansi\ansicpg1252\uc1
\deff0\ deflang1033\deflangfe1033{\fonttbl {\f0\froman\fcharset0\fprq2{\\*\panose 02020603050405020304}Times New Roman;}{\f30\froman\fcharset238\fprq2 Times New Roman CE;}{\f31\froman\fcharset204\fprq2 Times New Roman Cyr;}
{\f33\froman\fcharset161\fprq2 Times New Roman Greek;}{\f34\froman\fcharset162\fprq2 Times new Roman Tur;}{\f35\froman\fcharset177\fprq2 Times New Roman (Hebrew) ;}{\f36\froman\fcharset178\fprq2 Times New Roman (Arabic);}
{\f37\froman\fcharset186\fprq2 Times New Roman Baltic" }}{\colortbl;\red0\green0\blue0;\red0\green0\blue255;\red0\green255\blue255;\
red0\green255\blue0,\red255\green0\blue255;\red255\green0\blue0;\red255\green255\blu
e0;\red255\green255\blue255;
\red0\green0\blue128,\red0\green128\blue128,\red0\green128\blue0;\red128\green0\blue
128;\red128\green0\blue0;\red128\green128\blue0;\red128\green128\blue128;\red192\gre
en192\blue192; }{\stylesheet{
\ql \li0\ ri0\widctlpar\aspalpha\aspnum\faauto\adjustright\rin0\lin0\itap0
\fs24\lang1033\langfe1033\cgrid\langnp1033\langfenp1033 \snext0 Normal ;}{\\*\cs10
\additive Default paragraph Font;}}{\\*\filetbl }{\info{\author Walt Singleton}
{\operator Walt
Singleton}{\creatim\yr2002\mo11\dy27\hr13\min3}{\revtim\yr2002\mo11\dy27\hr13\min3}{
\version3}{\edmins0}{\nofpages1}{\nofwords39}{\nofchars226}{\\*\company
Siemens} {\nofcharsws0}{\vern8269} }
\widowctrl\ftnbj\aenddoc\noxlattoyen\expshrtn\noultrlspc\dntblnsbdb\nospaceforul\hyp
hcaps0\horzdoc\dghspace120\dgvspace120\dghorigin1701\dgvorigin1984\dghshow0\dgvshow3
\jcompress\viewkind4\viewscale100\nolnhtadjtbl \fet0\sectd \linex0\sectdefaultcl
{\\*\pnseclvl1\pnucrm\pnstart1\pnindent720\pnhang{\pntxta
.}}{\\*\pnseclvl2\pnucltr\pnstart1\pnindent720\pnhang{\pntxta
.}}{\\*\pnseclvl3\pndec\pnstart1\pnindent720\pnhang{\pntxta
.}}{\\*\pnseclvl4\pnlcltr\pnstart1\pnindent720\pnhang{\pntxta }}}{\\*\pnseclvl5
\pndec\pnstart1\pnindent720\pnhang\pntxtb (}{\pntxta
)}}{\\*\pnseclvl6\pnlcltr\pnstart1\pnindent720\pnhang{\pntxtb (}{\pntxta
)}}{\\*\pnseclvl7\pnlcrm\pnstart1\pnindent720\pnhang\pntxtb (}{\pntxta
)}}{\\*\pnseclvl8\pnlcltr\pnstart1\pnindent720\pnhang
{\pntxtb (}{\pntxta }}}{\\*\pnseclvl9\pnlcrm\pnstart1\pnindent720\pnhang{\pntxtb
(}{\pntxta )}}}\pard\plain \ql \li0\ri0\nowidctlpar\faauto\rin0\lin0\itap0
\fs24\lang1033\langfe1033\cgrid\langnp1033\langfenp1033 {\field{\\*\fldinst {\fs20
DATA "F:\\\\
Patent-Samples\\\\SampleDatasource.txt" }}{\fldrslt }}{\fs32 This is a Sample
Document!
\par }\pard \ql
\li0\ri0\widctlpar\aspalpha\aspnum\faauto\adjustright\rin0\lin0\itap0 {\fs20
\par
\par First Name: }{\fs20\lang1024\langfe1024\noproof Thomas} {\fs20 \tab \tab Last
Name: }{                                                            401
/fs20\lang1024\langfe1024\noproof Thomason}{\fs20
\par                                  402
\par }{\b\fs20\ul Dependent List: 406

FIG. 7A

700　\par
\par }\trowd \trgaph108\trleft-108\trbrdrt\brdrs\brdrw10 \trbrdrl\brdrs\brdrw10
\trbrdrb\brdrs\brdrw10 \trbrdrr\brdrs\brdrw10 \trbrdrh\brdrs\brdrw10
\trbrdrv\brdrs\brdrw10
\trftsWidth1\trautofit1\trpaddl108\trpaddr108\trpaddfl3\trpaddfr3 \clvertalt\clbrdrt
\brdrs\brdrw10 \clbrdrl\brdrs\brdrw10 \clbrdrb\brdrs\brdrw10 \clbrdrr\brdrs\brdrw10
\cltxlrtb\clftsWidth3\clwWidth3672 \cellx2896\clvertalt\clbrdrt\brdrs\brdrw10
\clbrdrl\brdrs\brdrw10 \clbrdrb\brdrs\brdrw10 \clbrdrr\brdrs\brdrw10
\cltxlrtb\clftsWidth3\clwWidth3672 \cellx5894\clvertalt\clbrdrt\brdrs\brdrw10
\clbrdrl\brdrs\brdnw10 \clbrdrb\brdrs\brdrw10 \clbrdrr\brdrs\brdrw10
\cltxlrtb\clftsWidth3\clwWidth3672 \cellx8748\pard
\q1 \li0\ri0\widctlpar\intb1\aspalpha\aspnum\faauto\adjustright\rin0\lin0
{\i\fs20\ul First Name\cell Last Name\cell Age\cell }\pard \ql
\li0\ri0\widctlpar\intbl\aspalpha\aspnum\faauto\adjustright\rin0\lin0 {\fs20 \trowd
\trgaph108\trleft108\trbrdrt
\brdrs\brdrw10 \trbrdrl\brdrs\brdrw10 \trbrdrb\brdrs\brdrw10 \trbrdrr\brdrs\brdrw10
\trbrdrh\brdrs\brdrw10 \trbrdrv\brdrs\brdrw10
\trftsWidth1\trautofit1\trpaddl108\trpaddr108\trpaddfl3\trpaddfr3
\clvertalt\clbrdrt\brdrs\brdrw10 \clbrdrl\brdrs\brdrw10
\clbrdrb\brdrs\brdrw10\clbrdrr\brdrs\brdrw10 \cltxlrtb\clftsWidth3\clwWidth3672
\cellx2896\clvertalt\clbrdrt\brdrs\brdrw10 \clbrdrl\brdrs\brdrw10
\clbrdrb\brdrs\brdrw10 \clbrdrr\brdrs\brdrw10 \cltxlrtb\clftsWidth3\clwWidth3672
\cellx5894\clvertalt
\clbrdrt\brdrs\brdrw10 \clbrdrl\brdrs\brdrw10 \clbrdrb\brdrs\brdrw10
\clbrdrr\brdrs\brdrw10 \cltxlrtb\clftsWidth3\clwWidth3672 \cellx8748\row }\trowd
\trgaph108\trleft-108\trbrdrt\brdrs\brdrw10 \trbrdrl\brdrs\brdrw10
\trbrdrb\brdrs\brdrw10 \trbrdrr
\brdrs\brdrw10\trbrdrh\brdrs\brdrw10 \trbrdrv\brdrs\brdrw10
\trftsWidth1\trautofit1\trpaddl108\trpaddr108\trpaddfl3\trpaddfr3
\clvertalt\clbrdrt\brdrs\brdrw10 \clbrdrl\brdrs\brdrw10 \clbrdrb\brdrs\brdrw10
\clbrdrr\brdrs\brdrw10
\cltxlrtb\clftsWidth3\clwWidth3672 \cellx2896\clvertalt\clbrdrt\brdrs\brdrw10
\clbrdrl\brdrs\brdrw10 \clbrdrb\brdrs\brdrw10 \clbrdrr\brdrs\brdrw10
\cltxlrtb\clftsWidth3\clwWidth3672 \cellx5894\clvertalt\clbrdrt\brdrs\brdrw10
\clbrdrl\brdrs\brdrw10
\clbrdrb\brdrs\brdrw10 \clbrdrr\brdrs\brdrw10 \cltxlrtb\clftsWidth3\clwWidth3672
\cellx8748
\pard \ql \li0\ri0\widctlpar\intbl\aspalpha\aspnum\faauto\adjustright\rin0\lin0
403　{\fs20\lang1024\langfe1024\noproof Norman} {\fs20 \cell
404　}{\fs20\lang1024\langfe1024\noproof Normanson}{\fs20 \cell
405　}{\fs20\lang1024\langfe1024\noproof 45}{\fs20 \cell }\pard \ql
\li0\ri0\widctlpar\intbl\aspalpha\aspnum\faauto\adjustright\rin0\lin0 {\fs20 \trowd
\trgaph108\trleft-108\trbrdrt\brdrs\brdrw10 \trbrdrl\brdrs\brdrw10
\trbrdrb\brdrs\brdrw10 \trbrdrr\brdrs\brdrw10 \trbrdrh\brdrs\brdrw10
\trbrdrv\brdrs\brdrw10
\trftsWidth1\trautofit1\trpaddl108\trpaddr108\trpaddfl3\trpaddfr3
\clvertalt\clbrdrt\brdrs\brdrw10 \clbrdrl\brdrs\brdrw10 \clbrdrb\brdrs\brdrw10

\clbrdrr
\brdrs\brdrw10 \cltxlrtb\clftsWidth3\clwWidth3672
\cellx2896\clvertalt\clbrdrt\brdrs\brdrw10 \clbrdrl\brdrs\brdrw10
\clbrdrb\brdrs\brdrw10 \clbrdrr\brdrs\brdrw10 \cltxlrtb\clftsWidth3\clwWidth3672
\cellx5894\clvertalt\clbrdrt\brdrs\brdrw10 \clbrdrl
\brdrs\brdrw10 \clbrdrb\brdrs\brdrw10 \clbrdrr\brdrs\brdrw10
\cltxlrtb\clftsWidth3\clwWidth3672 \cellx8748\row }\pard \ql
\li0\ri0\widctlpar\intbl\aspalpha\aspnum\faauto\adjustright\rin0\lin0

403  {\fs20\lang1024\langfe1024\noproof Stephen} {\fs20 \cell
404  }{\fs20\lang1024\langfe1024\noproof Stevenson}{\fs20 \cell
405  }{\fs20\lang1024\langfe1024\noproof 37}{\fs20 \cell }\pard \ql \li0\ri0\widctlpar\intbl\aspalpha\aspnum\faauto\adjustright\rin0\lin0 {\fs20 \trowd
\trgaph108\trleft-108\trbrdrt\brdrs\brdrw10 \trbrdrl\brdrs\brdrw10
\trbrdrb\brdrs\brdrw10 \trbrdrr\brdrs\brdrw10 \trbrdrh\brdrs\brdrw10
\trbrdrv\brdrs\brdrw10
\trftsWidth1\trautofit1\trpaddl108\trpaddr108\trpaddfl3\trpaddfr3
\clvertalt\clbrdrt\brdrs\brdrw10 \clbrdrl\brdrs\brdrw10 \clbrdrb\brdrs\brdrw10
\clbrdrr
\brdrs\brdrw10 \cltxlrtb\clftsWidth3\clwWidth3672
\cellx2896\clvertalt\clbrdrt\brdrs\brdrw10 \clbrdrl\brdrs\brdrw10
\clbrdrb\brdrs\brdrw10 \clbrdrr\brdrs\brdrw10 \cltxlrtb\clftsWidth3\clwWidth3672
\cellx5894\clvertalt\clbrdrt\brdrs\brdrw10 \clbrdrl
\brdrs\brdrw10 \clbrdrb\brdrs\brdrw10 \clbrdrr\brdrs\brdrw10
\cltxlrtb\clftsWidth3\clwWidth3672 \cellx8748\row }\pard \ql
\li0\ri0\widctlpar\intbl\aspalpha\aspnum\faauto\adjustright\rin0\lin0

403  {\fs20\lang1024\langfe1024\noproof Roger}{\fs20 \cell
404  }{\fs20\lang1024\langfe1024\noproof Rogerson}{\fs20 \cell
405  }{\fs20\lang1024\langfe1024\noproof 48}{\fs20 \cell }\pard \ql \li0\ri0\widctlpar\intbl\aspalpha\aspnum\faauto\adjustright\rin0\lin0 {\fs20 \trowd
\trgaph108\trleft-108\trbrdrt\brdrs\brdrw10 \trbrdrl\brdrs\brdrw10
\trbrdrb\brdrs\brdrw10 \trbrdrr\brdrs\brdrw10 \trbrdrh\brdrs\brdrw10
\trbrdrv\brdrs\brdrw10
\trftsWidth1\trautofit1\trpaddl108\trpaddr108\trpaddfl3\trpaddfr3
\clvertalt\clbrdrt\brdrs\brdrw10 \clbrdrl\brdrs\brdrw10 \clbrdrb\brdrs\brdrw10
\clbrdrr
\brdrs\brdrw10 \cltxlrtb\clftsWidth3\clwWidth3672
\cellx2896\clvertalt\clbrdrt\brdrs\brdrw10 \clbrdrl\brdrs\brdrw10
\clbrdrb\brdrs\brdrw10 \clbrdrr\brdrs\brdrw10 \cltxlrtb\clftsWidth3\clwWidth3672
\cellx5894\clvertalt\clbrdrt\brdrs\brdrw10 \clbrdrl
\brdrs\brdrw10 \clbrdrb\brdrs\brdrw10 \clbrdrr\brdrs\brdrw10
\cltxlrtb\clftsWidth3\clwWidth3672 \cellx8748\row }\pard \ql
\li0\ri0\widctlpar\aspalpha\aspnum\faauto\adjustright\rin0\lin0\itap0 {\fs20
\par }}

THIS IS A SAMPLE DOCUMENT!

201 ⌐  ⌐ 207      202 ⌐  ⌐ 208
FIRST NAME: THOMAS    LAST NAME: THOMASON

203 ⌐
DEPENDENT LIST:

| FIRST NAME /204 | LAST NAME /205 | AGE /206 |
|---|---|---|
| NORMAN | NORMANSON | 45 |
| STEPHEN | STEVENSON | 37 |
| ROGER | ROGERSON | 48 |
| 403 | 404 | 405 |

FIG. 8

DOCUMENT GENERATION SYSTEM AND USER INTERFACE FOR PRODUCING A USER DESIRED DOCUMENT

CROSS-REFERENCE TO RELATED APPLICATIONS

The present application is a non-provisional application of provisional application having Ser. No. 60/430,220 filed by Walt Singleton et al. on Dec. 2, 2002.

FIELD OF THE INVENTION

The present invention generally relates to computer information systems. More particularly, the present invention relates to a computer information system having a document generation system and user interface for producing a user-desired document.

BACKGROUND OF THE INVENTION

A computer information system, such as a healthcare information system, adapted to support a business enterprise, such as a hospital, typically provides a way for a user to organize and download information from the system in the form of a report. Typically, users generate reports for the enterprise using a custom report editor. Improvements to the custom report editor are generally proprietary and require the creation and maintenance of custom software for editing the layout of the reports to be produced by the system. Custom software may contain limitations to control the report's layout and aesthetics. Users also require additional training to understand and work with the custom report editor.

In view of the foregoing, it would be desirable to have a computer information system that provides reports, without a custom report editor, custom upgrade software, and additional user training. Accordingly, there is a need for a document generation system and user interface for producing a user desired document that overcomes these and other disadvantages of the prior systems.

SUMMARY OF THE INVENTION

According to one aspect of the present invention, a document generation system produces a document from information derived from an information repository. The document generation system includes a source of code, a source of document generation control information, and a document processor. The source of code represents a document template including data fields containing placeholder items to be replaced by desired data items, and a repetition identifier indicating that one of the data fields is to be replicated to provide a group of data fields to be replaced by the desired data items. The source of document generation control information supports insertion of the desired data items derived from the information repository in the data fields. The document processor applies the control information in replacing template document data field placeholder items with desired data items to produce a generated document.

This and other aspects of the present invention are further described with reference to the following detailed description and the accompanying figures, wherein the same reference numbers are assigned to the same features or elements illustrated in different figures.

BRIEF DESCRIPTION OF THE DRAWINGS

FIG. 2 illustrates a Rich Text Format (RTF) compatible template file for use with the document generation system, as shown in FIG. 1, in accordance with a preferred embodiment of the present invention.

FIG. 3 illustrates a word processor document adapted to display the RTF compatible template file, as shown in FIG. 2, in accordance with a preferred embodiment of the present invention.

FIG. 4 illustrates a data source map associating identification field names from the RTF compatible template file, as shown in FIG. 2, with an identification of a location (e.g., XPATH) in an information repository (e.g., Extensible Markup Language (XML) compatible document), as shown in FIG. 1, in accordance with a preferred embodiment of the present invention.

FIG. 6 illustrates desired data items, represented as an XML compatible template file and contained in an information repository, as shown in FIG. 1, for producing a single generated document, in accordance with a preferred embodiment of the present invention.

FIG. 7 is comprised of FIGS. 7A, 7B and 7C and illustrates a RTF compatible output file, produced by applying the XML compatible template file, as shown in FIG. 6, to the XSL compatible template file, as shown in FIG. 5, in accordance with a preferred embodiment of the present invention.

FIG. 8 illustrates a word processor document adapted to display the RTF compatible output file, as shown in FIG. 7, in accordance with a preferred embodiment of the present invention.

DETAILED DESCRIPTION OF THE PREFERRED EMBODIMENTS

Figure 1:
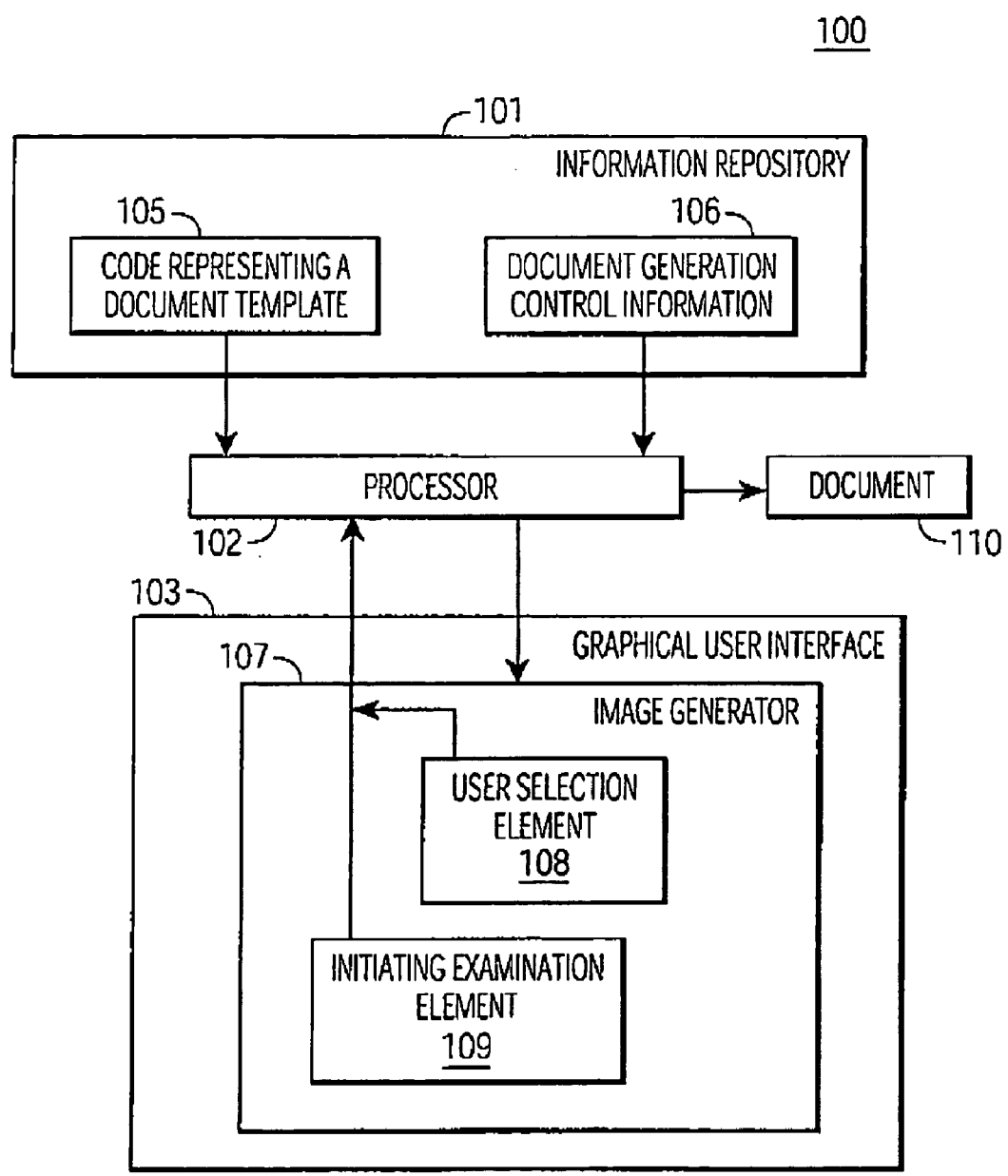
FIG. 1 illustrates a block diagram of a computer information system having a document generation system, in accordance with a preferred embodiment of the present invention.

FIG. 1 illustrates a block diagram of a computer information system, such as a hospital information system, having a document generation system 100, in accordance with a preferred embodiment of the present invention. The document generation system 100 generally includes an information repository 101, a document processor 102, and a graphical user interface 103. The information repository 101, representing a memory device for storing information, further includes a source of code 105 representing a document template 200 (shown in FIG. 2) and a source of document-generation control information 106. The graphical user interface 103 further includes an image generator 107, representing a data output device, which further includes a user selection element 108 and an examination element 109, each representing data input devices.

Generally, the processor 102 is electrically coupled to and adapted to receive information from each of the source of code 105 representing a document template 200 and the source of document-generation control information 106. The processor 102 is electrically coupled to the image generator 107, which is adapted to produce an image of the document and adapted to produce an image of the user input elements 108 and 109. The processor 102 is adapted to generate a document 110, preferably as represented by the image generator 107.

More particularly, the document generation system 100 produces a document 110 from information derived from the information repository 101. The source of code 105, representing a document template 200, includes data fields 201-206 (shown in FIG. 2, specifically FIGS. 2A and 2B) containing placeholder items 207-208 (shown in FIG. 2, specifically FIGS. 2A and 2B) to be replaced by desired data items 401-406 (shown in FIG. 4), and includes a repetition identifier 209-211 (shown in FIG. 2, specifically FIG. 2C) indicating that one of the data fields 201-206 is to be replicated to provide a group of data fields 201-206 to be replaced by multiple desired data items 401-406. The source of document generation control information 106 supports insertion of the desired data items 401-406 derived from the information repository 101 in the data fields. The document processor 102 applies the control information to replace template-document data field placeholder items 207-208 with desired data items 401-406 to produce the document 110.

From a user interface perspective, the graphical user interface system 103 supports generation of the document 110. The image generator 107, such as a display, generates one or more image windows (not shown), such as represented by browser pages, including the user selection element 108 and the examination element 109, such as dialog boxes selectable with a mouse or other data input device. The user selection element 108 enables user selection of a document template. The document template 200 includes data fields 201-206 containing placeholder items 207-208 to be replaced by desired data items 401-406, and includes a repetition identifier 209-211 indicating one of the data fields 201-206 is to be replicated to provide a group of data fields to be replaced by multiple desired data items 401-406. The examination element 109 initiates examination of the document template 200 to identify an individual data field 201-206 and inserts a desired data item 401-406 derived from an information repository 101 having the data field to produce the document 110.

From a process perspective, a method for producing a document from information derived from an information repository 101 includes the step of examining code 105 representing a document template 200 and the step of applying control information 106. Preferably, the processor 102 performs the steps. In the step of examining code 105 representing a document template 200, the document template 200 includes data fields 201-206 containing placeholder items 207-208 to be replaced by desired data items 401-406, and includes a repetition identifier 209-211 indicating one of the data fields 401-406 is to be replicated to provide a group of data fields to be replaced by multiple desired data items 401-406. In the step of applying control information, the step supports insertion of the desired data items 401-406 derived from the information repository 101 having the data fields to replace template-document data field placeholder items 207-208 with desired data items 401-406 to produce the document 110.

In practice, the document generation system 100 facilitates the creation of enterprise-based report templates using a standard word processing application such as Microsoft Word®. At runtime, Extensible Markup Language (XML) data 600 (shown in FIG. 6) from an application is merged with the report template 200 that is created in Word to produce a completed report. FIG. 6 illustrates desired data items 401-406 comprising an XML compatible template file 600 (contained in the information repository 100 shown in FIG. 1) for producing the document 110, in accordance with a preferred embodiment of the present invention.

Preferably, the document generation system 100 supports repeating groups of information 209-211 (i.e. multiple line items in an invoice). The document generation system 100 advantageously eliminates the need for a proprietary report writer system. The document generation system 100 supports sophisticated organization specific report creation at a total lower cost. The lower cost includes savings in user training, since users trained in a standard word processing package such as Microsoft Word automatically have the knowledge necessary to work with the preferred report templates 200. Further, the use of a word processing package, as opposed to a report editor, typically has the advantage of being able to produce more aesthetically pleasing reports.

Figures 2, 2A, 2B, 2C:
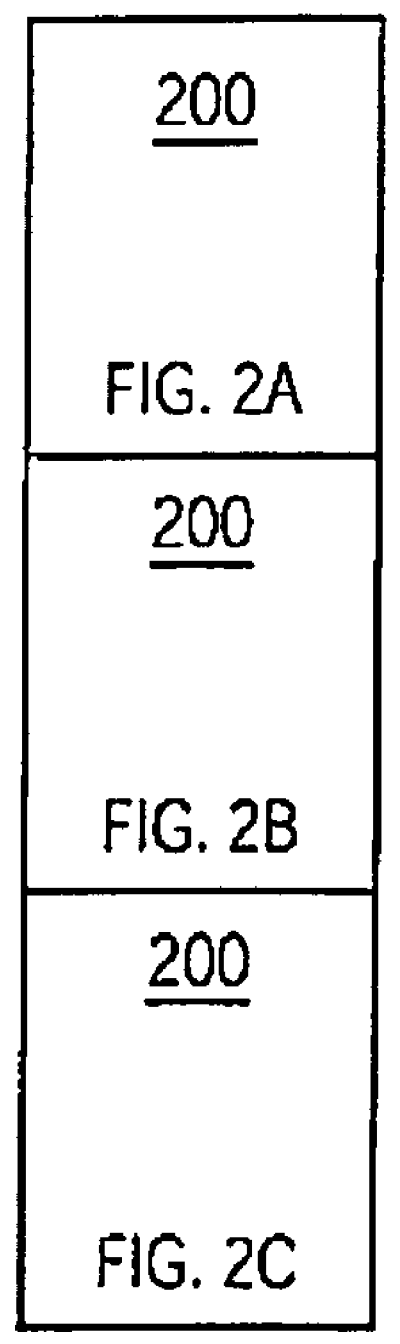
Figure 5:
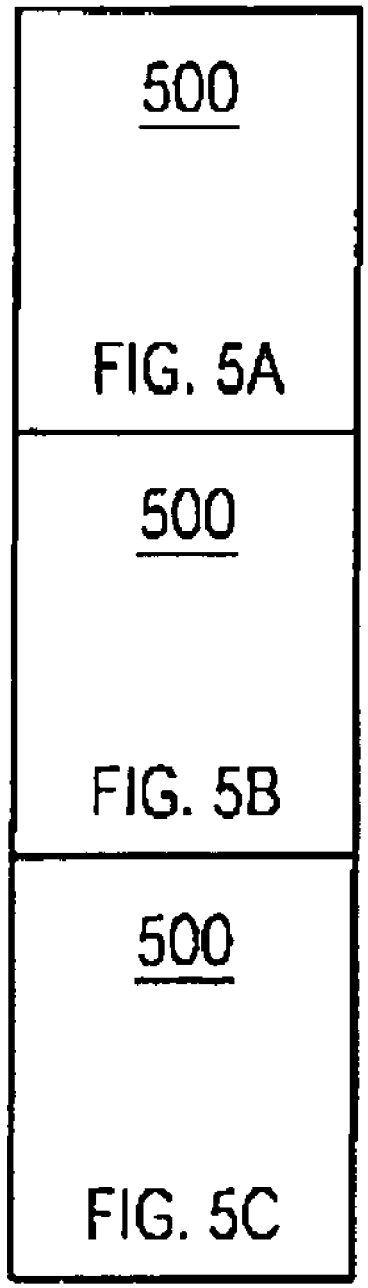
FIG. 5 is comprised of FIGS. 5A, 5B and 5C and illustrates an Extensible Stylesheet Language (XSL) compatible template file, derived from the RTF compatible template file, as shown in FIG. 2, in accordance with a preferred embodiment of the present invention.

Report templates 200 are created and edited in Microsoft Word. When completed, a report template 200 is saved in a rich text format (RTF) file, as shown in FIG. 2. The RTF file is provided as input to a program that converts the RTF, shown in FIG. 2, into an Extensible Stylesheet Language (XSL) file, as shown in FIG. 5. The following three rules are used during the conversion process.

1. Where MERGE FIELDS 207-211, as shown in FIG. 2, are found, they are replaced with an XSL 'value of select' statement, as shown in FIG. 5. An XPath for that merge field is located in the data source 106, as shown in FIG. 4, and then placed as the source of the select.

The XPath is the result of an effort to provide a common syntax and semantics for functionality shared between XSL Transformations (XSLT) and XPointer (Xpointer). The primary purpose of XPath is to address parts of an XML document. In support of this primary purpose, it also provides basic facilities for manipulation of strings, numbers, and booleans. XPath uses a compact, non-XML syntax to facilitate use of XPath within URLs and XML attribute values. XPath operates on the abstract, logical structure of an XML document, rather than its surface syntax. XPath gets its name from its use of a path notation as in URLs for navigating through the hierarchical structure of an XML document.

2. Where BOOKMARKS are found, it is verified that the bookmark is an object bookmark that designates each column of a single row of a table. An XSL 'for-each select' statement applies to each RTF code that relates to each bookmark. The XPath for that bookmark is located in the data source 106 and then placed as the source of the select.

3. Other RTF codes not handled by the above two (2) rules are passed through without translation.

Figures 7, 7A, 7B, 7C:
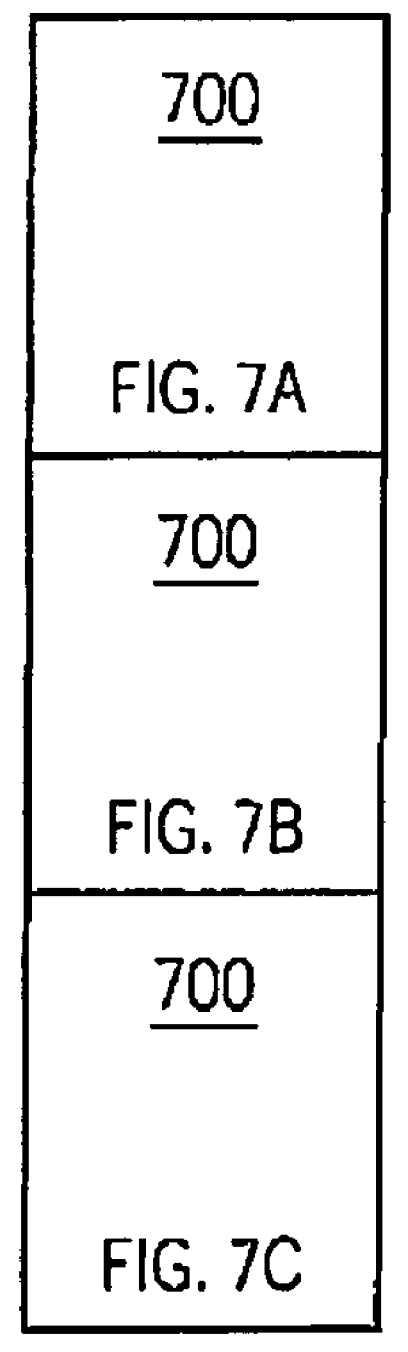

At runtime, data is provided in XML format, as shown in FIG. 6. This XML data 401-406, as well as the template (now in XSL format), can be provided to any industry standard XML parser (i.e., any parser that can handle XSL transformations) to produce an RTF output file 700, as shown in FIG. 7, with the merged data incorporated therein. An output device, such as a printer, (not shown) produces the completed report, represented as the document 110, responsive to receiving the RTF output file 700. Refer to FIG. 7 illustrating the RTF compatible output file 700, produced by applying the XML compatible data file 600, as shown in FIG. 6, to the XSL compatible template file 500, as shown in FIG. 5, in accordance with a preferred embodiment of the present invention. Further, refer to FIG. 8 illustrating a word processor document 800 adapted to display the RTF compatible output file 700, as shown in FIG. 7, in accordance with a preferred embodiment of the present invention.

Preferably, the control information 106 contains one or more of the following three identifications. An identification of data fields 201-206 in the template document 200 available to be replaced by desired data items 401-406. An identification of a location in the information repository of a desired data item 401-406 associated with an individual data field 201-206. An identification of a location in the information repository 101 of a first data item 401-406 for insertion in an individual data field 201-206 of a group of data fields 201-206 and data items 401-406 sequentially linked to the first data item 401-406 are inserted in remaining data fields of the group of data fields 201-206. Preferably, the location identifier of the first data item 401-406 includes an Extensible Markup Language (XML) compatible XPath value.

Preferably, the repetition identifier 209-211 further includes a Rich Text Format (RTF) compatible Bookmark. The code 105, representing a document template 200, is Rich Text Format (RTF) compatible. The document processor 102 processes template document data, excluding the desired data items 401-406 inserted in the placeholder items 207-208, by incorporating the template document data in the document 110 and the document 110 is compatible with Extensible Stylesheet Language (XSL) (shown in FIG. 5). The document 110 includes one or more of the following: (a) a Standard Generalized Markup Language (SGML) document, (b) an XML document, (c) a hypertext markup language (HTML) document, and (d) a multimedia file. The desired data items 401-406 derived from the information repository 101 are Extensible Markup Language (XML) compatible data items derived from an XML compatible document (shown in FIG. 6).

Preferably, the document processor 102 processes template document data (shown in FIG. 2) in Rich Text Format (RTF), as shown in FIG. 2, together with desired data items 401-406 derived from the information repository 101 in Extensible Markup Language (XML) to provide the generated document 110 in an Extensible Stylesheet Language (XSL) format. The document processor 102 further includes an XML parser (preferably included in the processor 102) to process the generated document 110 in Extensible Stylesheet Language (XSL) format (shown in FIG. 5) to provide a processed document in Rich Text Format (RTF) (shown in FIG. 7).

Preferably, the document processor 102 examines a document template 200 to identify an individual data field 201-206, containing a placeholder item 207-208, and incorporate a link in the individual data field 201-206 identifying a corresponding item in the document-generation control information 106. The corresponding item enables the document processor 102 to locate one of the desired data items 401-406 in the information repository 101 for insertion in the individual data field 201-206.

FIG. 2 illustrates a Rich Text Format (RTF) compatible template file 200 for use with the document generation system 100, as shown in FIG. 1, in accordance with a preferred embodiment of the present invention. Technically, Object Management System (OMS) templates are MS Word documents saved in Rich Text File (RTF) format, as shown in FIG. 2. In word processing and desktop publishing applications, a template, otherwise called a style sheet, is a file or form that defines the layout of a document. When a user fills in a template, the user specifies such parameters as the page size, margins, and fonts. Style sheets are useful because the user can use the same style sheet for many documents. For example, a user could define one template for personal letters, another for official letters, and a third for reports.

A MS Word document may be saved as an RTF file 200, such as that shown in FIG. 2. When saved as the RTF file 200, some advanced, infrequently used formatting features may be lost when saving a file as RTF from MS Word. An RTF template 200, capable of being merged, has substitution values for the data that are merged in at a later time. These "place holders" 207-208 in the RTF template document 200 are known as merge fields. When editing a template document 200, the Mail Merge features of MS Word are advantageously used to apply the desired data items 401-406 to the template 200 to produce the document 110.

MS Word mail merge options are set under Tools|Mail Merge in a conventional MS Word menu (not shown). When editing a document with mail merge features enabled, there is a toolbar button named 'Insert Merge Field' available. This function allows the user to insert a named item that is substituted with a data value at a later time, when the merge occurs.

FIG. 3 illustrates a word processor document 300 adapted to display the RTF compatible template file 200, as shown in FIG. 2, in accordance with a preferred embodiment of the present invention.

FIG. 4 illustrates a data source map 400, otherwise called a data source file, associating identification field names from the RTF compatible template file 200, as shown in FIG. 2, with an identification of a location (e.g., XPATH) in an information repository 100 (e.g., Extensible Markup Language (XML) compatible document), as shown in FIG. 1, in accordance with a preferred embodiment of the present invention.

The data source is shown in a tab-delineated format, although comma-delimited format can also be used. Each column contains a field name in the top row and its associated XML XPATH in the bottom row.

The mail merge options dialog box (not shown) also includes a setting for 'Data Source' that identifies the source 400 of the data items 401-406, as shown in FIG. 4. A data source file 400 contains a list of possible merge fields available for a template document 200. The data source file 400 also stores a translation from each merge field name to an XML XPath value. An XPath is used to point to the proper location of the desired data in an XML file.

The data source file 400 is preferably in tab delimited text format. It is a 2 row by N column table, which has a 1-to-1 mapping from the merge field name to the XPath. MS Word uses the format of the data source file 400 in its native Mail Merge process. However, this compatibility is provided solely for the ease of creating and editing template documents in MS Word. Preferably, the user should not execute the mail merge from the MS Word menu. Typically, the mail merge is managed by the OMS, which pulls the desired data from an XML stream, using the template 200 and its associated data source 400 to create the final document 110.

Typically, hospital personnel are not provided the permission to alter data sources; they may only view them as references for building templates. However, hospital personnel usually may alter any aspect of a template 200 as long as the merge fields chosen are located in the template's data source.

Preferably, each template 200 uses only one data source file 400. Since many different templates may share common data items 401-406, a data source file 400 may be used for multiple templates 200. For example, a German version of a document 110 and an English version of a document 110 would have different templates 200, but would use the same data 401-406.

FIG. 5 illustrates an Extensible Stylesheet Language (XSL) compatible template file 500, derived from the RTF compatible template file 200, as shown in FIG. 2, in accordance with a preferred embodiment of the present invention. The processor 102 reads the Rich Text Format compatible file

200 and replaces Rich Text Format (RTF) compatible MERGE FIELDS with "xsl:value-of select" statements, as shown in FIG. 7. The XPATH to use in the "xsl:value-of select" statement is the XPATH that is paired with the name of the MERGE FIELD in the data source file 400 in FIG. 4.

In addition, Rich Text Format compatible BOOKMARK information (i.e., the repetition identifier 209-211) is used to position the "xsl:for-each select" and "/xsl:for-each" statements which are inserted into the XSL file 700. The XPATH to use in the "xsl:for-each select" statement is the XPATH that is paired with the name of the BOOKMARK in the data source file 400 in FIG. 4.

Bookmarks are an advanced feature used in MS Word templates. Bookmarks allow for an OMS implementation of repeating groups 209-211. Bookmarks are hidden fields in the template document 200 that contain information identifying a repeating group 209-211. OMS uses bookmarks to highlight a row in a table that is capable of being a repeating group 209-211 of merge fields.

To create a repeating group 209-211, highlight a row in a table that has been created. Go to Insert|Bookmark in the conventional MS Word menu (not shown). A name for the bookmark is then provided. The associated merge fields in the data source file correspond to a data item that is in a repeating group 209-211.

A repeating group in a template 200 begins as a single row in a table (shown in FIG. 3). This row contains merge fields. The distinguishing feature of a repeating group 209-211 is that the table can grow in size depending on how many items 401-406 are in the repeating group 209-211. For example, a point of service bill may contain a list of services that are billable to a patient. This list is variable in size, and the number of items is not known at the time the template 200 is designed.

The document generation system advantageously uses of a standard word processing application (e.g., Microsoft Word) to create enterprise report templates. Thereby, users are able to employ a standard word processing application to control report layout and aesthetics.

Hence, while the present invention has been described with reference to various illustrative embodiments thereof, the present invention is not intended that the invention be limited to these specific embodiments. Those skilled in the art recognize that variations, modifications, and combinations of the disclosed subject matter can be made without departing from the spirit and scope of the invention as set forth in the appended claims.

What is claimed is:

1. A document generation system for producing a document from information derived from an information repository, comprising:
    a source of code representing a document template including, data fields containing placeholder items to be replaced by desired data items, and also including a repetition identifier indicating one of said data fields is to be replicated to provide a group of data fields to be replaced by a plurality of said desired data items;
    a source of document generation control information supporting insertion of said desired data items derived from said information repository in said data fields; and
    a document processor for applying said control information in replacing template document data field placeholder items with desired data items, to produce a generated document.

2. The system according to claim 1, wherein said control information contains at least one of, (a) an identification of data fields in said template document available to be replaced by desired data items, (b) an identification of a location in said information repository of a desired data item associated with an individual data field, and (c) an identification of a location in said information repository of a first data item for insertion in said individual data field of said group of data fields and data items sequentially linked to said first data item are inserted in remaining data fields of said group of data fields.

3. The system according to claim 2, wherein said location identifier of said first data item comprises an Extensible Markup Language compatible XPath value.

4. The system according to claim 1, including a data source file associating data field names of said document template with a data location in an information repository, said data source file comprising at least one of, (a) a comma delimited file and (b) a flat file.

5. The system according to claim 1, wherein said repetition identifier comprises a Rich Text Format (RTF) compatible Bookmark.

6. The system according to claim 1, wherein said code representing said document template is at least one of, (a) word processing application compatible and (b) Rich Text Format (RTF) compatible.

7. The system according to claim 1, wherein said document processor processes template document data, excluding said desired data items inserted in said placeholder items, by incorporating said template document data in said generated document and said generated document is compatible with Extensible Stylesheet Language (XSL).

8. The system according to claim 1, wherein said generated document comprises one or more of, (a) an SGML document, (b) an XML document, (c) an HTML document, and (d) a multimedia file.

9. The system according to claim 1, wherein said desired data items derived from said information repository are Extensible Markup Language (XML) compatible data items derived from an XML compatible document.

10. The system according to claim 1, wherein said document processor processes template document data in Rich Text Format (RTF) together with desired data items derived from said information repository in Extensible Markup Language (XML) to provide said generated document in an Extensible Stylesheet Language (XSL) format.

11. The system according to claim 10, wherein said document processor includes an XML parser to process said generated document in Extensible Stylesheet Language (XSL) format to provide a processed document in Rich Text Format (RTF).

12. The system according to claim 1, wherein said document processor examines said document template to identify an individual data field containing a placeholder item and incorporate a link in said individual data field identifying a corresponding item in said document generation control information, said corresponding item enabling locating one of said desired data items in said information repository for insertion in said individual data field.

13. A graphical User interface system supporting adaptive generation of a document, comprising:
    an image generator for generating at least one image window including:
    an image element enabling User selection of a text processing application compatible document template, said document template including, data fields containing placeholder items to be replaced by desired data items, and also including a repetition identifier indicating one of said data fields is to be replicated to provide a group of data fields to be replaced by a plurality of said desired data items; and an image element for initiating examination of said document template to identify an individual data field and insert a desired data item derived from an information repository in said data field, to produce a generated document.

14. A method for adaptively producing a document from information derived from an information repository, comprising the steps of:

examining text processing application compatible code representing a document template, said document template including, data fields containing placeholder items to be replaced by desired data items, and also including a repetition identifier indicating one of said data fields is to be replicated to provide a group of data fields to be replaced by a plurality of said desired data items; and applying control information supporting insertion of said desired data items derived from said information repository in said data fields to replace template document data field placeholder items with desired data items, to produce a generated document.

15. A method for adaptively producing a document comprising the steps of:

receiving text processing application compatible electronic document template including:
data fields having placeholder items, and
at least one repetition identifier indicating at least one of said data fields that is to be replicated;

receiving data items; and merging said electronic document template with said data items to produce the document responsive to replacing placeholder items with said data items, and responsive to replicating the at least one of said data fields that is to be replicated to provide a group of data fields to be replaced by a plurality of said desired data items.

16. A method for producing a document according to claim 15, wherein said step of merging is performed by at least one of, (a) XSL compatible code and (b) a mail merge application program.

17. A method for producing a document according to claim 15, further comprising the steps of:

receiving a selection of text processing application compatible electronic document templates; and receiving a selection of a source of the data items.

* * * * *